US006834273B1

(12) United States Patent
Sansone et al.

(10) Patent No.: US 6,834,273 B1
(45) **Date of Patent: *Dec. 21, 2004**

(54) SYSTEM FOR CAPTURING INFORMATION FROM A POSTAL INDICIA PRODUCING DEVICE SO AS TO CORRECT IMPROPERLY PAID MAIL PIECES

(75) Inventors: Ronald P. Sansone, Weston, CT (US); Robert A. Law, Jr., Ridgefield, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/298,782

(22) Filed: Apr. 23, 1999

(51) Int. Cl.[7] ................................................ G06F 17/60

(52) U.S. Cl. ....................... 705/410; 705/409; 705/411; 705/407; 705/406; 705/405; 705/404; 705/403; 705/402; 705/401

(58) Field of Search ................................ 705/410, 411, 705/409, 407, 406, 405, 404, 403, 402, 401

(56) References Cited

U.S. PATENT DOCUMENTS 4,649,266 A * 3/1987 Eckert ........................ 235/432
4,796,193 A * 1/1989 Pitchenik .................... 705/408
4,941,091 A * 7/1990 Breault et al. ................ 705/30
5,008,827 A * 4/1991 Sansone et al. ............. 705/409
5,293,319 A 3/1994 DeSha et al. .......... 364/464.02
5,319,562 A * 6/1994 Whitehouse ................ 705/403
5,812,666 A * 9/1998 Baker et al. ................ 380/277
5,819,239 A * 10/1998 Berson et al. .............. 705/403
6,311,892 B1 * 11/2001 O'Callaghan et al. ...... 235/375
6,327,580 B1 * 12/2001 Pierce et al. ................ 705/401
6,523,013 B2 * 2/2003 Shah et al. ................. 705/410
6,701,304 B2 * 3/2004 Leon .......................... 705/401

FOREIGN PATENT DOCUMENTS

EP 0658 861 B1 9/1998 ........... G07B/17/02

OTHER PUBLICATIONS

PMG Runyon reports to BOG, May 1997, Direct Marketing v60n1, pp: 15.*
New postal imprinting to affect Soho, Jun. 1997, Managing Office Technology, v42n6 pp: 13.*

* cited by examiner

*Primary Examiner*—Tariq R. Hafiz
*Assistant Examiner*—Akiba Robinson Boyce
(74) *Attorney, Agent, or Firm*—Ronald Reichman; Angelo N. Chaclas

(57) ABSTRACT

A system for correcting the rating and payment of mail pieces scanned and weighed by the post. The foregoing is accomplished by: uniquely identifying mail pieces during the metering process; maintaining a record of the postage that has been applied to the mail pieces and the characteristics of the mail pieces; scanning the mail pieces to determine if the correct postage has been paid; comparing the scanned and weighed mail pieces to the maintained record; and correcting any underpayments or overpayments.

18 Claims, 11 Drawing Sheets

SYSTEM FOR CAPTURING INFORMATION FROM A POSTAL INDICIA PRODUCING DEVICE SO AS TO CORRECT IMPROPERLY PAID MAIL PIECES

CROSS REFERENCE TO RELATED APPLICATIONS

Reference is made to commonly assigned co-pending patent application filed herewith entitled "Method And Apparatus For Detecting Misuse Of A Postal Indicia" in the names of Robert A. Law, Jr. and Ronald P. Sansone; and filed herewith entitled "A System For Capturing Information From A Postal Indicia Producing Device So As To Produce A Report Covering The Payment Of Value Added Taxes And Fees" in the names of Ronald P. Sansone and Robert A. Law, Jr.

FIELD OF THE INVENTION

The invention relates generally to the field of postage devices and more particularly to a system for correcting the rating and payment of mail pieces.

BACKGROUND OF THE INVENTION

Postage meters are commonly used to apply postal indicia to mail pieces to pay for postage. To apply a postal indicia to a mail piece using a postage meter, a mail piece to be mailed is inserted into the postage meter, which imprints a postal indicia on the mail piece indicating that a certain amount of postage has been paid. The postage meter deducts the amount of postage applied to the mail piece from an amount available, which is stored in the postage meter. Periodically, the amount available is increased, and the sender is billed for the increase. The process of increasing the amount available is referred to as "refilling" or "recharging" the postage meter. Usually, an organization other than the post office is responsible for monitoring and refilling such postage meters, billing and collecting fees from senders, as well as remitting to the post office a sum of money corresponding to the postage applied by such postage meters.

Often improper postage is placed on a mail piece. If an error in the rating and/or payment of individual mail pieces was made, the post would return the mail piece to the mailer. The mailer would have spent the value of postage placed on the returned mail piece and the mailer would have to affix additional postage on the mail piece before mailing the returned mail piece. If an error in the rating and/or payment of numerous mail pieces was made, the post would telephone the mailer of the mail pieces and inform the mailer of the errors. The mailer would go to the post office to view the mail pieces having improper postage. If the mailer applied an improper amount of postage, the mailer would have to pay the additional postage due the post before the mail pieces would be delivered. The foregoing may consume a large amount of time.

An another disadvantage of the prior art is that when the mailer went to the post office, the mailer did not know the settings that was placed on the postage meter nor the weight the scale attributed to the mail piece. Since these items were in the mailers office.

SUMMARY OF THE INVENTION

This invention overcomes the disadvantages of the prior art by providing a system for correcting the rating and payment of mail pieces scanned and weighed by the post. The foregoing is accomplished by: uniquely identifying mail pieces during the metering process; maintaining a record of the postage that has been applied to the mail pieces and the characteristics of the mail pieces; scanning the mail pieces to determine if the correct postage has been paid; comparing the scanned and weighed mail pieces to the maintained record; and correcting any underpayments or overpayments.

DETAILED DESCRIPTION OF THE PREFERRED EMBODIMENT

Figure 1:
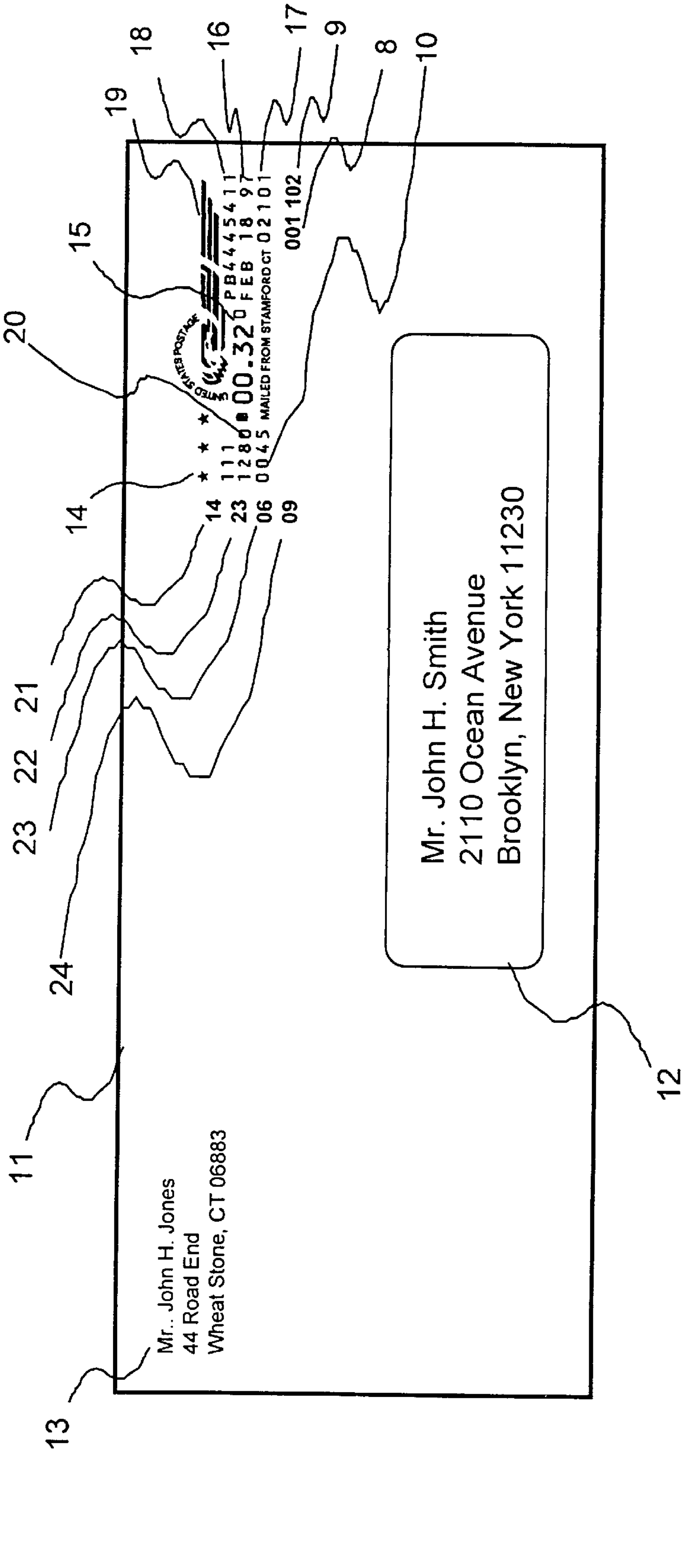
FIG. 1 is a drawing of a mail piece containing a postal indicia having a unique series of numbers.

Referring now to the drawings in detail, and more particularly to FIG. 1, the reference character 11 represents a mail piece that has a recipient address field 12 and a sender address field 13. A postal indicia 14 that was made by a electronic meter is affixed to mail piece 11. Indicia 14 contains a dollar amount 15, the date 16, that postal indicia 14 was affixed to mail piece 11, the place the mail piece was mailed from 17, the postal meter serial number 18 an eagle 19, a piece count 10, the type of mail piece 9, i.e., first class, country code 8 and a security code 20. Security code 20 is a unique number that is derived from address field 12 and information contained in the postage meter that affixed indicia 14. The manner in which security code 20 is obtained is disclosed in the Sansone et al U.S. Pat. No. 4,831,555 entitled "Unsecured Postage Applying System", herein incorporated by reference. The time that indicia 14 was set to be affixed to mail piece 11 is indicated in spaces 21, 22, 23 and 24. Space 21 represents hours in military time i.e., 14 equals 2:00 PM. Space 22 represents minutes i.e., 23 minutes after the hour, space 23 represents seconds and space 24 represents hundredths of a second. An additional number indicating the owner of the contents of mail piece 11 is stored in electronic postage meter 50 (described in the description of FIG. 3). The additional number may be the tax identification number of the owner of the contents of mail piece 11, i.e., 11123067701.

Figure 2:
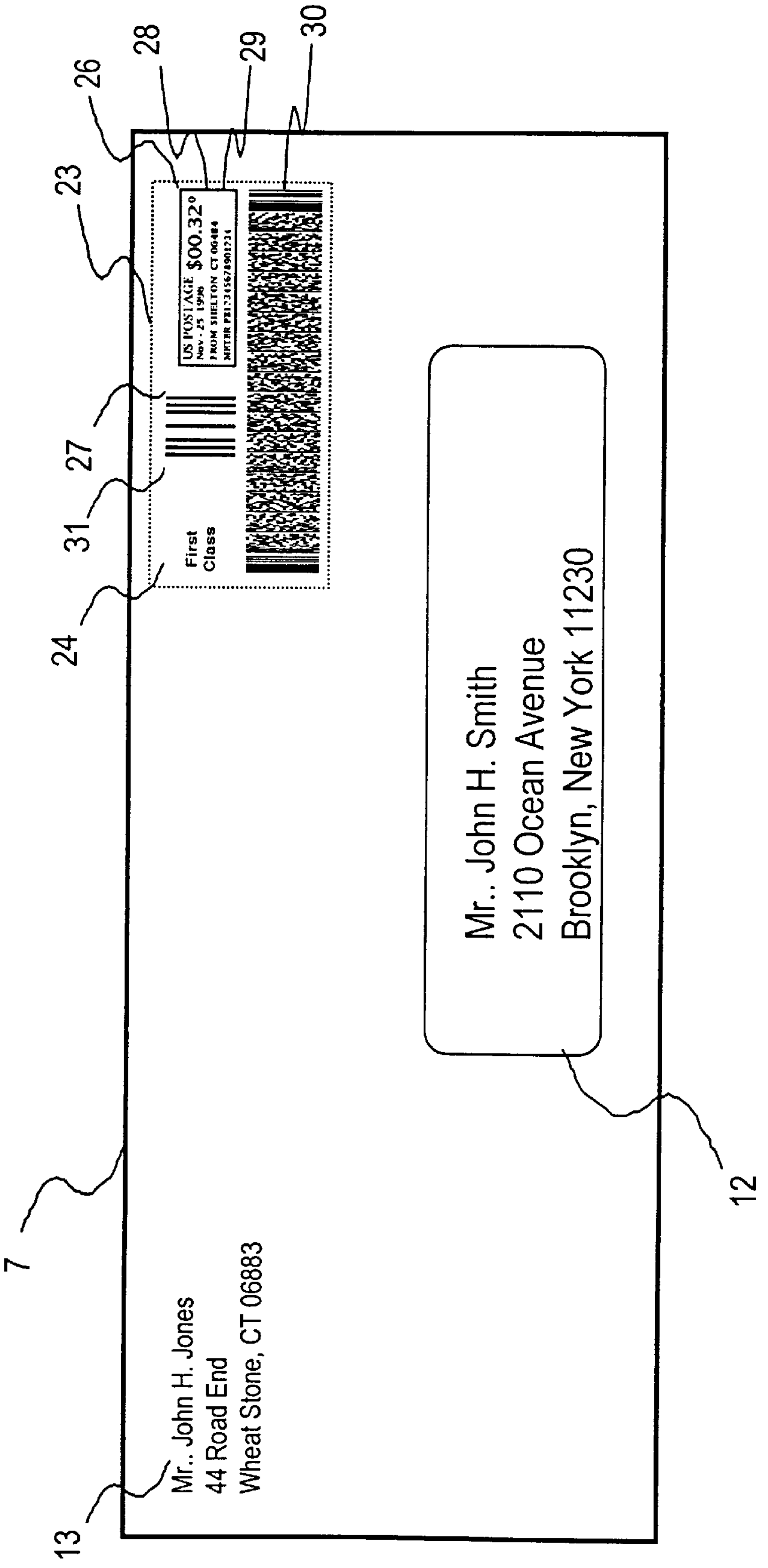
FIG. 2 is a drawing of a mail piece containing a information based postal indicia (IBI) having a unique series of numbers.

FIG. 2 is a drawing of a mail piece containing a USPS Information-Based Indicia (IBI) 24. Indicia 24 may be affixed by a printer that was coupled to a postal security device and a computer. Indicia 24 may also be produced by a personal computer that is coupled to a data center. Mail piece 7 has a recipient address field 12 and a sender address field 13. Indicia 24 contains a dollar amount 26, the date 27 that postal indicia 24 was affixed to mail piece 7, the place 28 that mail piece 7 was mailed, the postal meter serial number 29, a two-dimensional encrypted bar code 30, a Facing Identification Mark (FIM) 31 and a security code that is contained within code 30. The manner in which the security code is obtained is disclosed in the Sansone et al U.S. Pat. No. 4,831,555 entitled "Unsecured Postage Applying System", herein incorporated by reference. The time that indicia 24 was set to be affixed to mail piece 7 is contained in bar code 30. The type of mail is also contained within bar code 30, i.e., a first class mail piece. The country code is also contained within bar code 30. The country code is the code of the country to which mail piece 7 is going to be delivered. An additional number indicating the owner of the contents of mail piece 7 is stored in a personal computer meter 51 or in virtual meter 52 (described in the description of FIG. 3). The additional number may be the tax identification number of the owner of the contents of mail piece 7.

Figure 3:
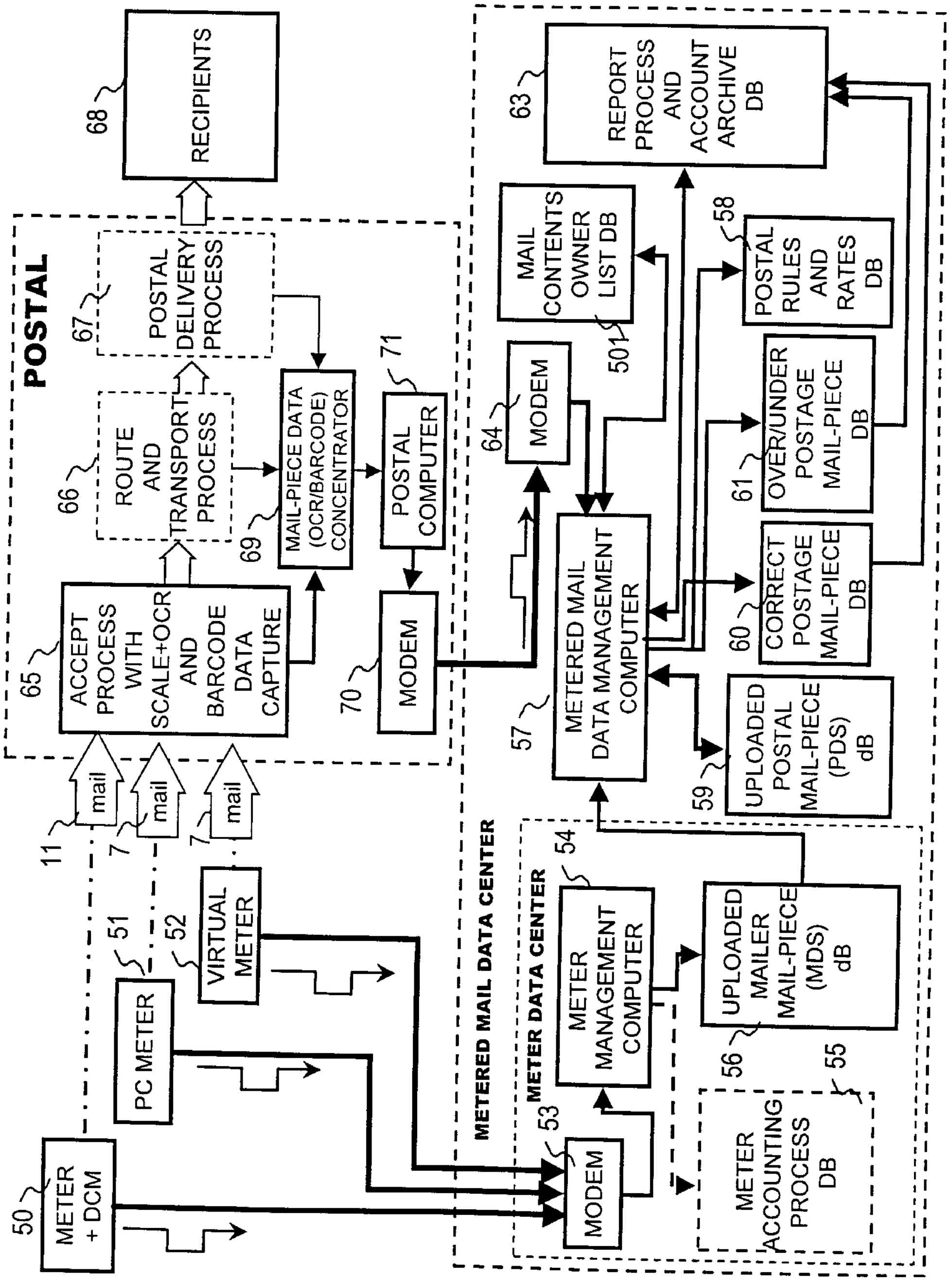
FIG. 3 is a block diagram of the apparatus of this invention.

FIG. 3 is a block diagram of the apparatus of this invention. Meter 50 is an electronic postage meter coupled to an electronic interface unit (EIU). Personal computer 51 is a personal computer coupled to a postal security device (PSD) and a printer. Virtual meter 52 is a personal computer coupled to a printer. Meter 50 may be used to produce mail piece 11 and indicia 14 (described in FIG. 1). Meters 51 and 52 may be used to produce mail piece 7 and indicia 24 (described in FIG. 2).

Meters 50, 51 and 52 are coupled to modem 53. During a meter upload or meter refill, i.e., when additional funds are added to the register of meter 50 (described in FIG. 2), or when additional funds are added to the personal security device of meter 51, or when funds are added to the memory of the personal computer of meter 52 (described in FIG. 2), one or more unique meter mail piece numbers that has been affixed to a mail piece are uploaded to meter management computer 54 via modem 53.

A unique meter mail piece number comprises: the meter serial number;

the date the postal indicia was affixed to the mail piece; the time in hours, minutes, seconds and parts thereof that the indicia was set to be affixed to the mail piece; a piece count; the amount of postage affixed to the mail piece; the type of mail piece; the country code of the country where the mail piece is going to be delivered and an additional number that identifies the owner of the owner of the contents of the mail piece. Since the entity operating the postage meter does not have to be the owner of the mail piece. The additional number may be the tax identification number of the owner of the contents of the mail piece. The additional number is not printed on the mail piece. Thus, the unique meter mail piece number for mail piece 11 of FIG. 1 would be: PB 4445411 021897 1423069 0045 00320 102 001 11123067701.

Computer 54 stores the unique meter mail piece numbers and transmits them to uploaded mailer unique meter mail piece number data base 56. Meter accounting process data base 55 is used to manage and maintain the inner workings of meters 50, 51 and 52. Data base 56 stores the unique meter mail piece numbers for meters 50, 51 and 52 for each mailer.

After mail pieces 7 and/or 11 are posted and reach an entry post office, a optical character recognition scanner 65 at the entry post office, scans and weighs mail piece 7 and/or 11 and captures data appearing on mail piece 7 and/or 11. Then mail piece 7 and/or 11 is routed and transported by the normal postal process 66. After mail piece 7 and/or 11 is transported to the exit post office, mail piece 7 and/or 11 is delivered by the current postal delivery process 67 to recipient 68.

Mail piece data concentrator 69 receives data captured from scanner 65, process 66 and process 67. Concentrator 69 concentrates the information it collects and organizes the information into files. Concentrator 69 provides information files to postal computer 71.

The information files will be transmitted from computer 71 to modem 70 and then from modem 70 to modem 64. Modem 64 will convey the information files to metered mail data management computer 57. Computer 57 will format the information files into unique postal mail piece numbers.

A unique postal mail piece number comprises: the meter serial number that affixed the indicia on the mail piece; the date the postal indicia was affixed to the mail piece; the time in hours, minutes, seconds and parts thereof that the indicia was set to be affixed to the mail piece; a piece count; the amount of postage affixed to the mail piece; the type of mail piece, and the country code of the country where the mail piece is going to be delivered. Thus, the unique postal mail piece number for mail piece 11 of FIG. 1 would be: PB 4445411 021897 1423069 0045 00320 102 001.

Computer 57 stores the unique postal mail piece numbers in uploaded postal mail piece data base 59. Computer 57 will: read the stored numbers from uploaded mailer mail piece data base 56 and uploaded postal data base 59; locate the mail piece that corresponds to the stored numbers; and decide whether or not the correct postage has been paid for the mail piece that corresponds to the stored numbers. Computer 57 will apply the regulations, rates and rules in postal rules and rates data base 58 to determine if the data for the mail piece should be stored in data base 60 or data base 61. If the correct postage has been paid for the mail piece that corresponds to the stored numbers, the stored numbers are stored in correct postage mail piece data base 60. If the correct postage has not been paid for the mail piece that corresponds to the stored numbers, the stored numbers are stored in under/over postage mail piece data base 61.

After analyzing the information contained in data base 58 with the information contained in data bases 60 and 61 computer 57 will generate a report that will be stored in report process and account archive data base 63. The above report will indicate: the mail pieces that have paid too much postage; the mail pieces that have paid insufficient postage; the mail pieces that have paid the correct postage.

Figure 4:
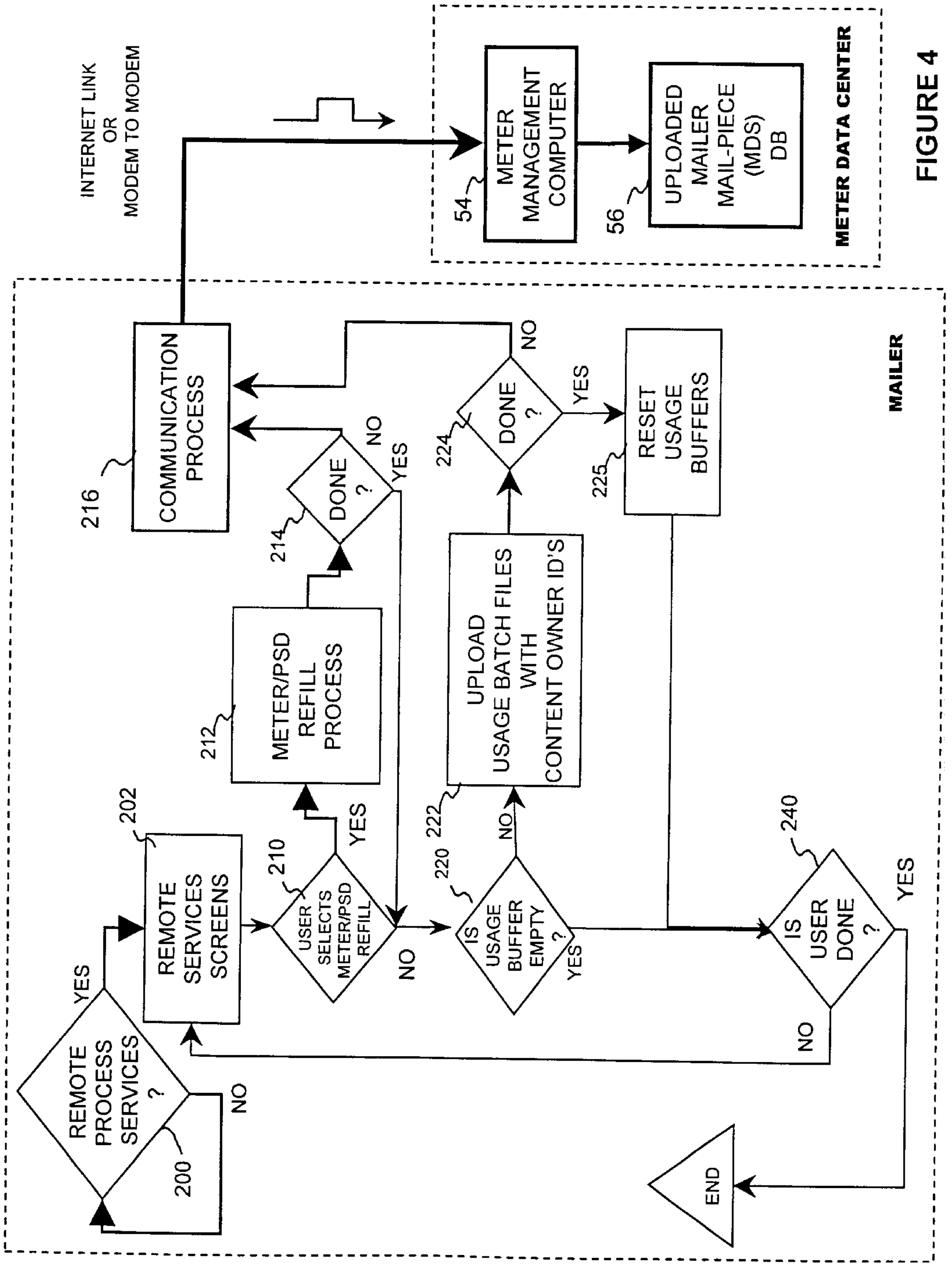
FIG. 4 is a flow chart showing how meter management computer 54 communicates with meters 50 and 51.

FIG. 4 is a flow chart showing how meter management computer 54 communicates with meters 50 and 51. This program is stored in computer 54. The program begins In decision block 200. Block 200 determines if remote process services have been requested. If remote process services have been requested, the program goes to block 202 the remote service screens.

Then the program goes to decision block 210. Block 210 determines whether or not the user has selected to refill meter 50 or 51. If the user has selected to refill meter 50 or 51 the program goes to block 212 to refill meter 50 or 51. Now the program goes to decision block 214. Block 214 determines whether or not meter 50 or 51 has been refilled. If block 214 determines that the refill process has not been completed the program goes to block 216 communication process.

The communication process performs a refill process by communicating with meter management computer 54 via modem 53. If block 214 determines that the refill process has been completed the program goes to block 220 to determine whether or not the usage buffer is empty. If the usage buffer is not empty the program goes to block 222 where the meter usage batch files are uploaded with the content owners identification. If the usage buffer are empty the program goes to block 240.

Now the program goes to decision block 224. Block 224 determines whether or not the usage batch files have been uploaded with the content owners identification. If the batch files have not been uploaded with the content owners identification the program goes to block 216 communication process. If the batch files have been uploaded with the content owners identification the program goes to block 225. Block 225 resets the usage buffers. Then the program goes to decision block 240. Decision block 240 determines whether or not the usage buffers are empty. If the usage buffers are not empty the program goes to the input of block 202. If the usage buffers are empty the program ends.

Figure 5:
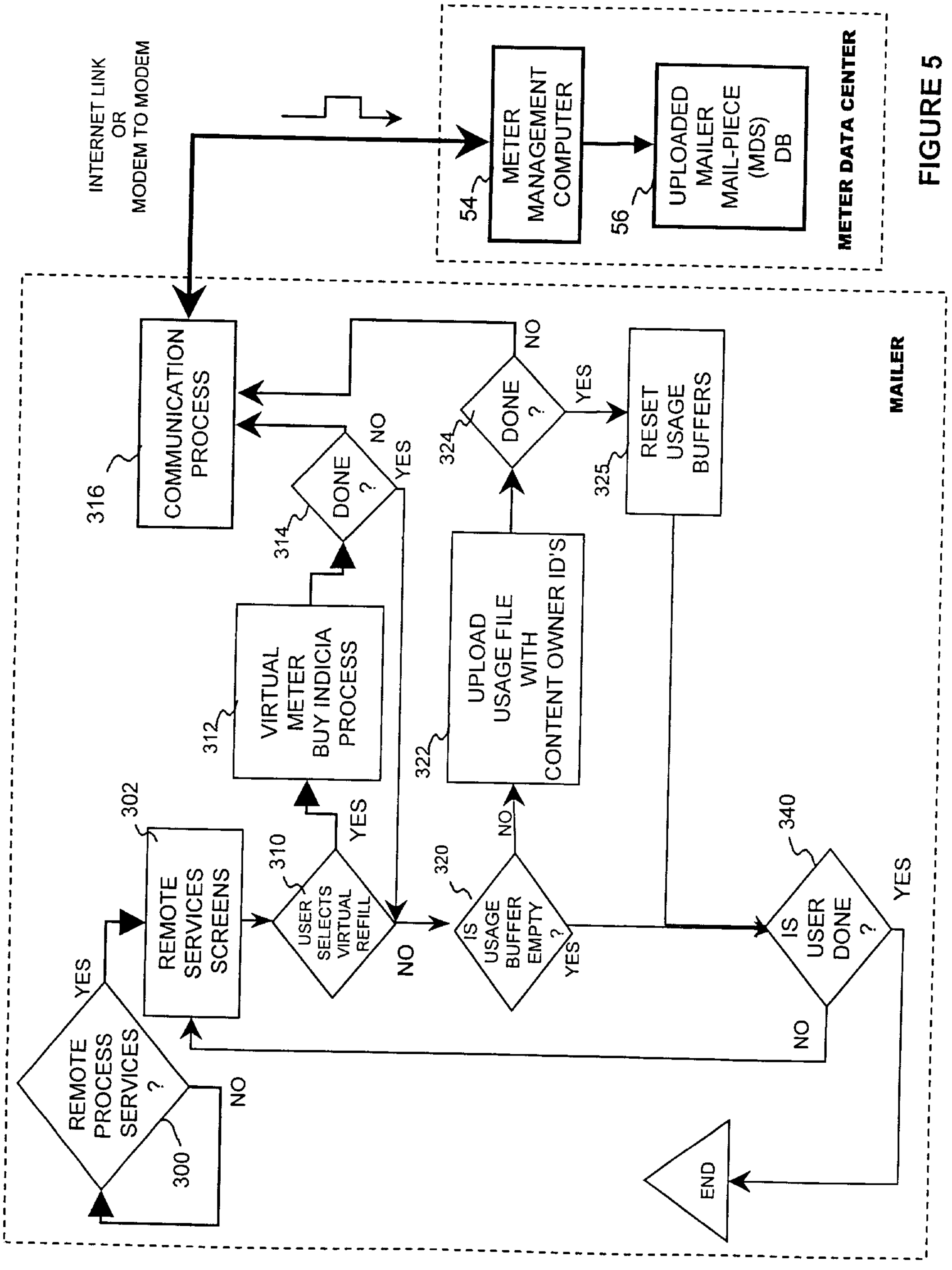
FIG. 5 is a flow chart showing how meter management computer 54 communicates with meter 52.

FIG. 5 is a flow chart showing how computer 54 communicates with meter 52. This program is stored in computer 56. The program begins In decision block 300. Block 300 determines if remote process services have been requested. If remote process services have been requested, the program goes to block 302 the remote service screens.

Then the program goes to decision block 310. Block 310 determines whether or not the user has selected a refill of virtual meter 52. If the user has selected a meter refill the program goes to block 312 to allow meter 52 to purchase indicia. Now the program goes to decision block 314. Block 314 determines whether or not meter 52 has completed purchasing indicia. If block 314 determines that meter 52 has completed purchasing indicia the program goes to decision block 320. If block 314 determines that meter 52 has not completed purchasing indicia the program goes to block 316 communication process.

The communication process recharges meter 52 by communicating with meter management computer 54 via modem 53. If block 310 determines that the user has not selected the meter refill the program goes to block 320. Block 320 determines whether or not the usage buffer is empty. If the usage buffer is not empty the program goes to block 322 where the usage files are uploaded with the content owners identification. If the usage buffer are empty the program goes to block 340.

Now the program goes to decision block 324. Block 324 determines whether or not the usage files have been uploaded with the content owners identification. If the files have not been uploaded with the content owners identification the program goes to block 316 communication process. If the files have been uploaded with the content owners identification the program goes to block 325. Block 325 resets the usage buffers. Then the program goes to decision block 340. Decision block 340 determines whether or not the usage buffers are empty. If the usage buffers are not empty the program goes to the input of block 302. If the usage buffers are empty the program ends.

Figure 6:
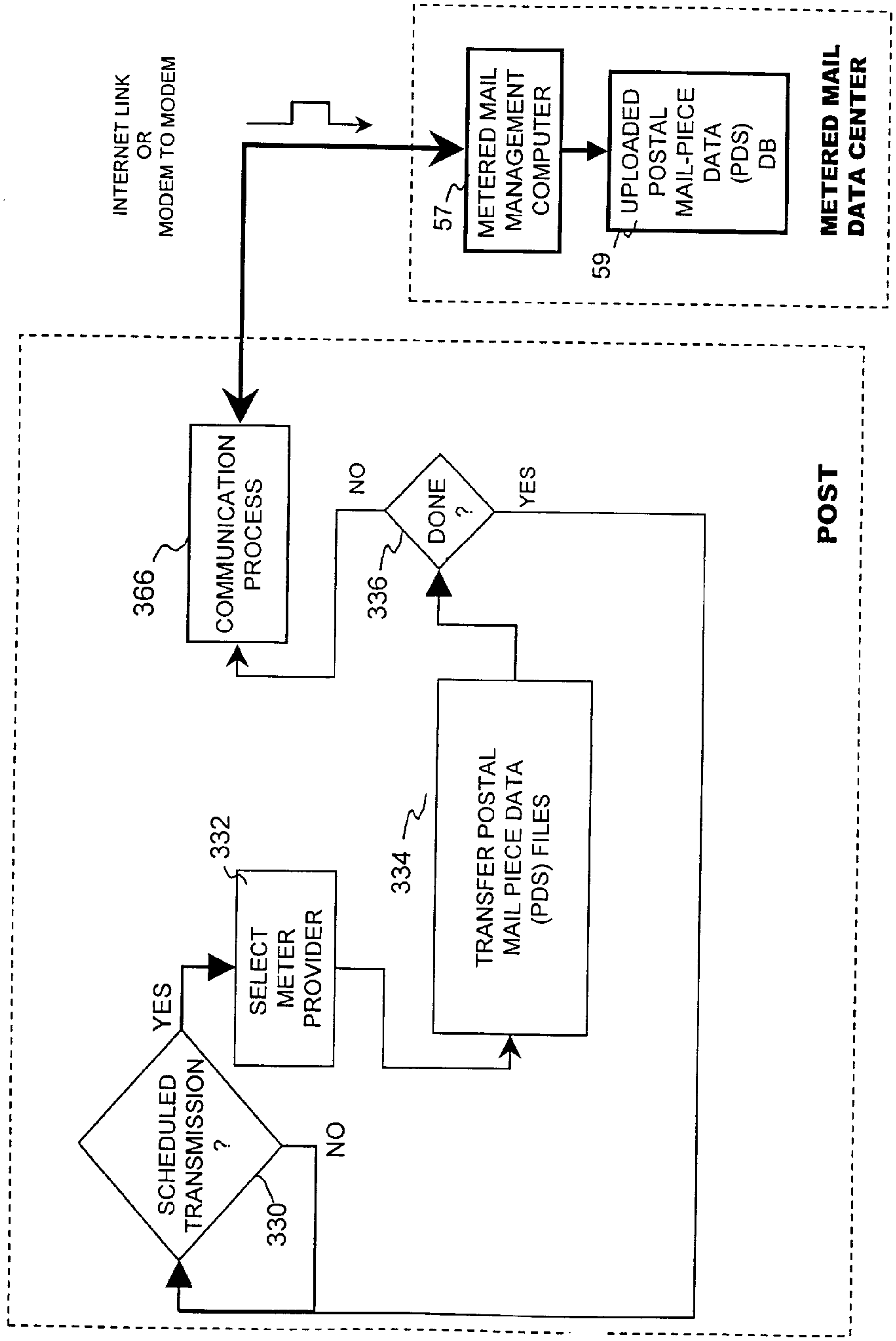
FIG. 6 is a flow chart showing how metered mail management computer 57 of the metered mail data center communicates with postal computer 71.
Figure 7:
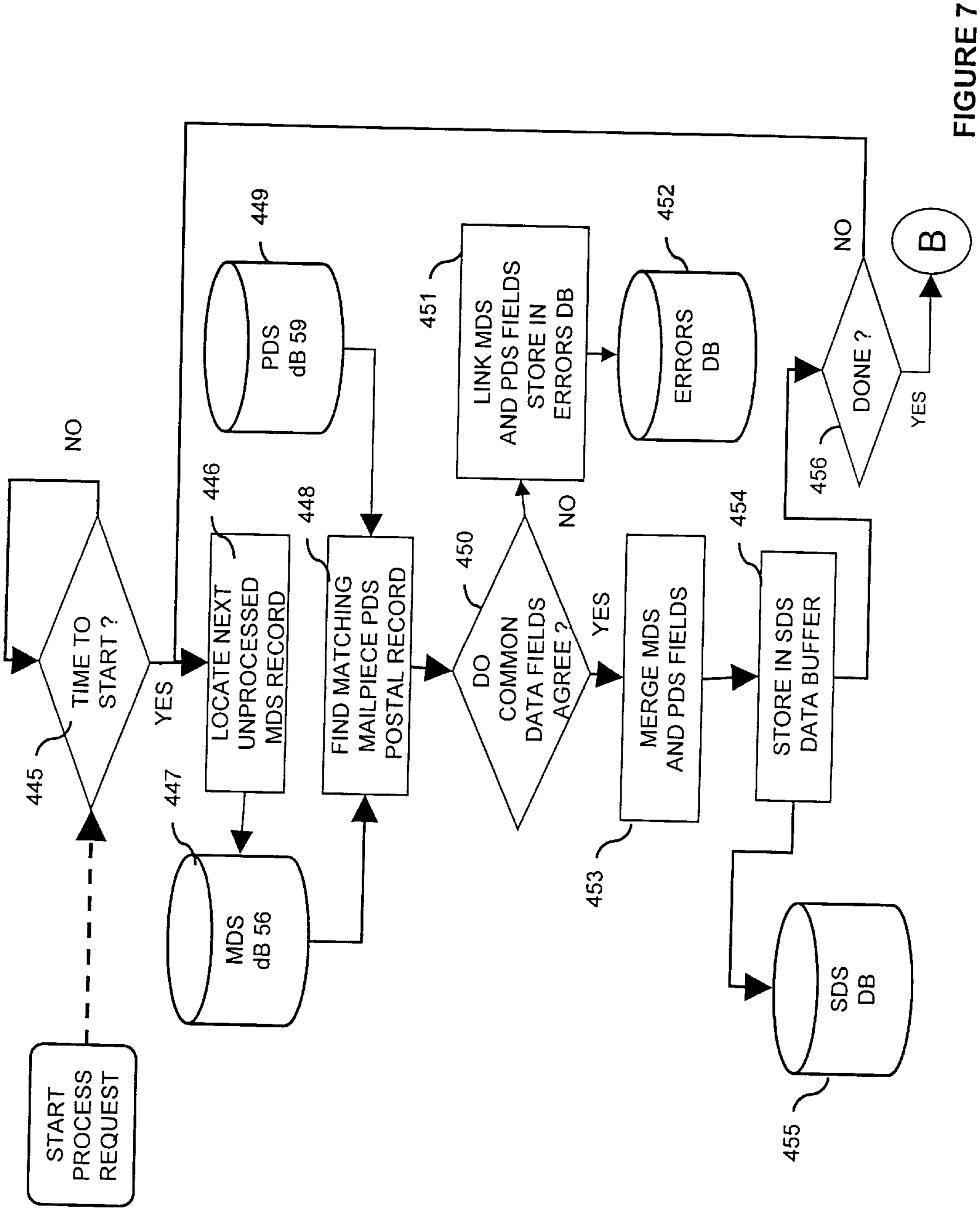
FIGS. 7–11 is a flow chart showing how data uploaded from data bases 56 and 59 are used by computer 57 to generate reports.

FIG. 6 is a flow chart showing how metered mail management computer 57 of the metered mail data center communicates with postal computer 71. The program begins at block 330. Block 330 determines whether or not computer 71 is scheduled to transmit information to computer 57. If block 330 determines that computer 71 is not scheduled to transmit information to computer 57, the program goes back to the input of block 330. If block 330 determines that computer 71 is scheduled to transmit information to computer 57, the program goes to block 332. Block 332 selects the meter provider, i.e., Pitney Bowes Inc.

Then the program goes to block 334. Block 334 transfers the unique postal mail piece numbers read by the post and concentrated by concentrator 69. At this point the program goes to block 336. Block 336 determines whether or not the unique postal mail piece numbers read by the post, for a specific meter provider, and concentrated by concentrator 69 have been transferred. If block 336 determines that the unique postal mail piece numbers read by the post, for a specific meter provider, and concentrated by concentrator 69 have been transferred the program goes back to the input of block 330. If block 336 determines that the unique postal mail piece numbers read by the post, for a specific meter provider, and concentrated by concentrator 69 have been transferred the program goes to communication process 366. Communication process 366 transmits the unique postal mail piece numbers read by the post, for a specific meter provider, concentrated by concentrator 69 and stored in computer 71 to metered mail management computer 57 via modems 70 and 64 or any other communications channel known in the art.

FIGS. 7–11 is a flow chart showing how data uploaded from data bases 56 and 59 are used by computer 57 to generate reports. The program begins in FIG. 7 when computer 57 is asked to start a process request. Then the program goes to decision block 445. Block 445 determines whether or not it is time to start the process. If block 445 determines it is not time to start the process the program goes back to the input of block 445. If block 445 determines it is time to start the process the program goes to the input of block 446. Block 446 locates the next unprocessed unique meter mail piece number record from data base 56. The records stored in data base 56 were produced by each meter at a specific time. Thus, for each meter the records are ordered by time. Then the program goes to block 448 to find the matching unique postal mail piece record in block 449 that corresponds for the record selected from data base 56. The unique meter mail piece number found in data base 56 for mail piece 11 would be:

PB 4445411 021897 1423069 0045 00320 102 001 11123067701.

The unique postal mail piece number found in data base 449 for mail piece 11 would be:

PB 4445411 021897 1423069 0045 00320 102 001.

The common data fields for mail piece 11 would be:

PB 4445411 021897 1423069 0045 00320 102 001.

Now the program goes to decision block 450. Block 450 determines whether or not the common data fields for the unique meter mail piece number found in data base 56 agrees with the common data fields for the unique postal mail piece number found in data base 449. If block 450 determines that the common data fields do not agree the program goes to block 451. Block 451 links the unique meter mail piece numbers that were not found and the unique postal mail piece numbers that were not found. Then the program stores the numbers that were not found in errors data base 452. An operator may review the records contained in data base 452 and attempt to reconstruct the data fields to remove the errors. If block 450 determines that the common data fields do agree the program goes to block 453.

Block 453 merges the unique meter mail piece number with the unique postal mail piece number. The merged number for mail piece 11 would be:

PB 4445411 021897 1423069 0045 00320 102 001 11123067701.

Figure 8:
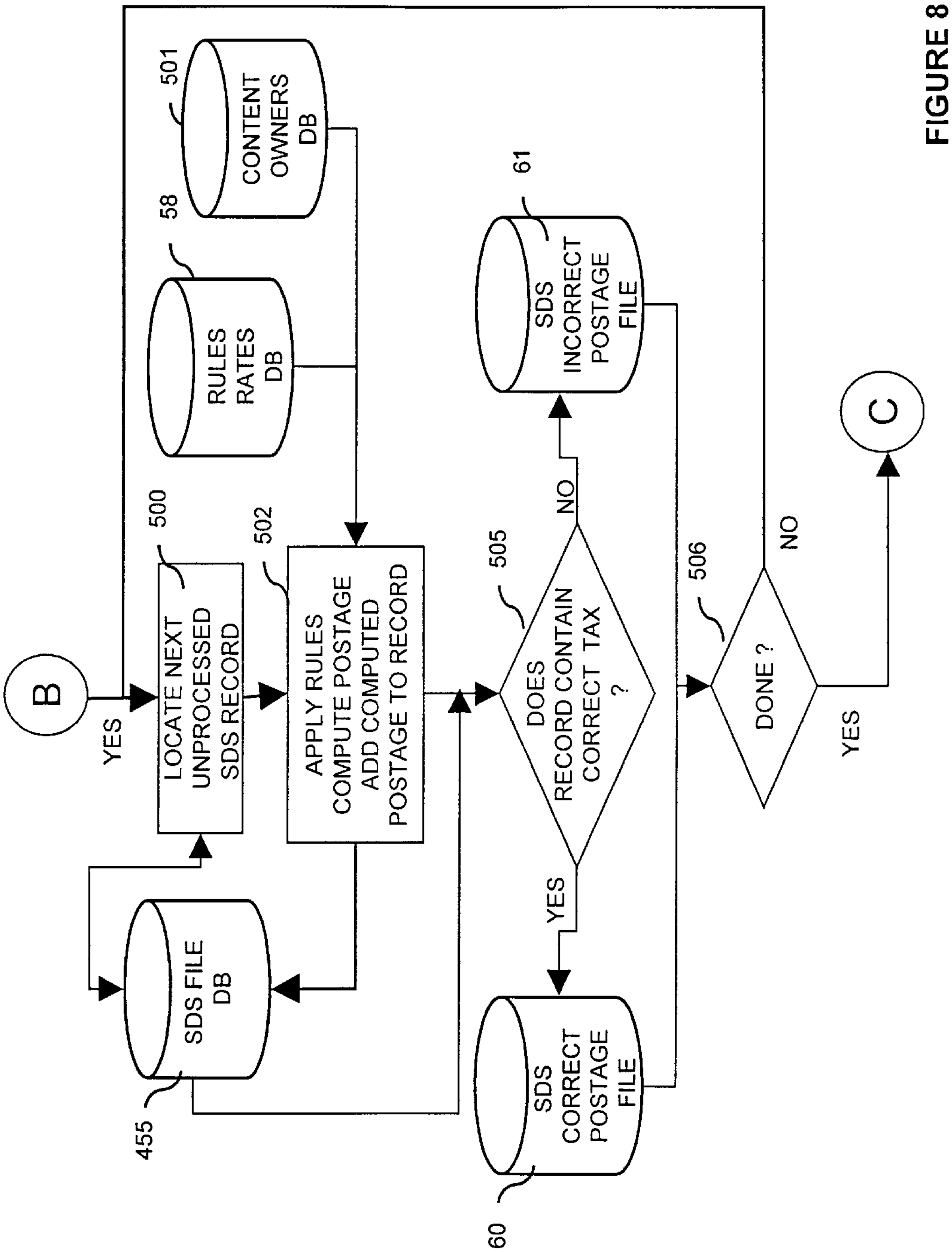

This number would be called the standardized data string. The standardized data string will be stored in data buffer 454 and then in standardized data string data base 455. Then the program goes to decision block 456. Decision block 456 determines whether or not the program has completed storing the standardized data strings. If the program has not completed storing the standardized data strings the program goes back to the input of block 446. If the program has completed storing the standardized data strings the program goes to the input of block 500 (FIG. 8).

In block 500 the program locates the next unprocessed standardized data string record. Then the program goes to block 502 to apply rules, compute postage and add the computed postage to the record. In performing the foregoing, block 502 receives information from rules rates data base 58, content owners data base 501 and standardized data string file data base 455. The program will go back to block 455 to obtain the next file from data base 455. The program will also go to decision block 505. Decision block 505 determines whether or not the record contains the correct postage. If block 505 determines that the record indicates that the incorrect postage was paid, the standardized data string for that file is stored in data base 61. If block 505 determines that the record indicates that the correct postage was paid, the standardized data string for that file is stored in data base 60. Then the program goes to decision block 506. Decision block 506 determines whether or not the standardized data string from block 455 has been processed. If there is another standardized data string from block 455 to be processed the program goes back to the input of block 500.

Figure 9:
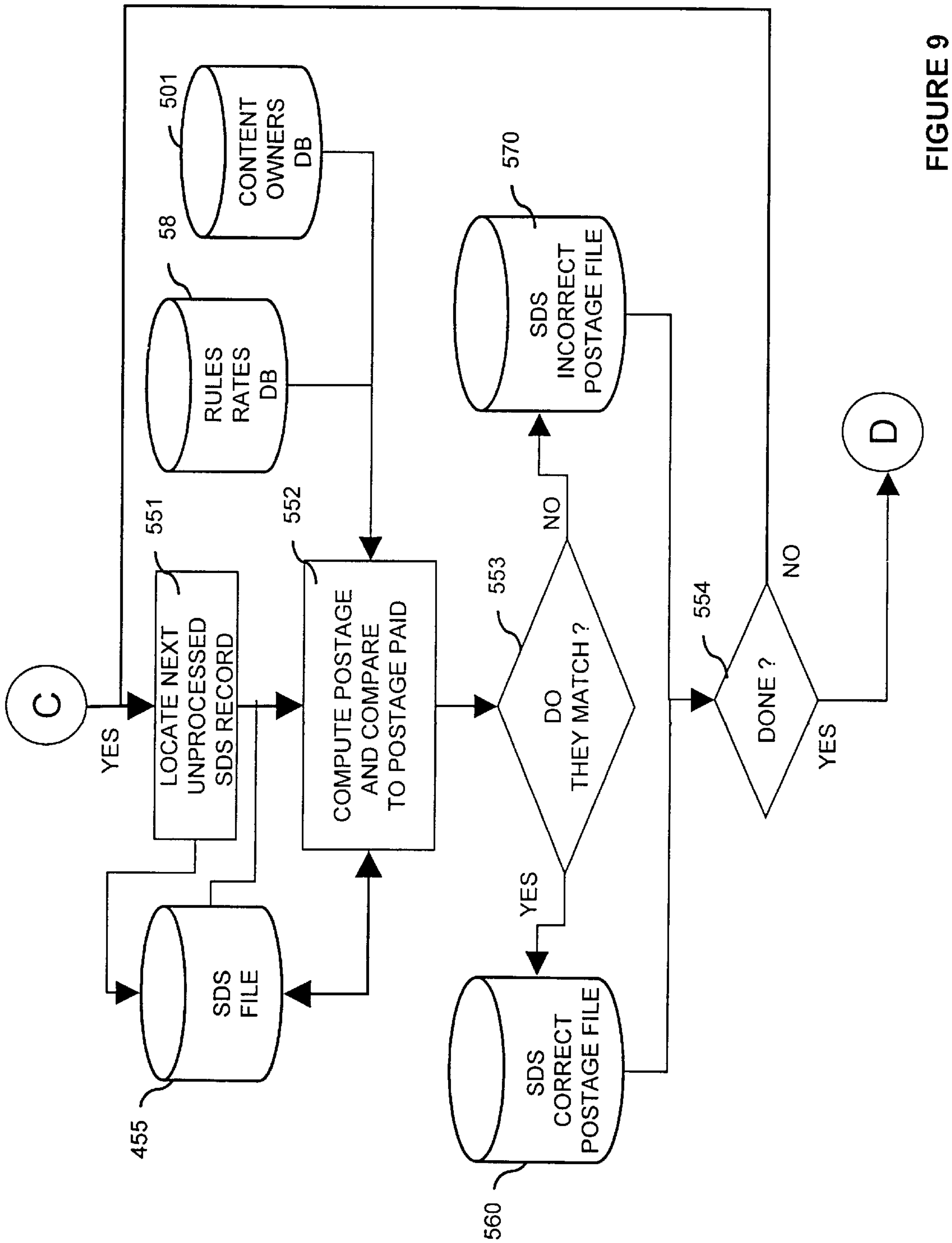

If there is not another standardized data string from block 455 to be processed the program goes to the input of block 551 (FIG. 9).

Figure 10:
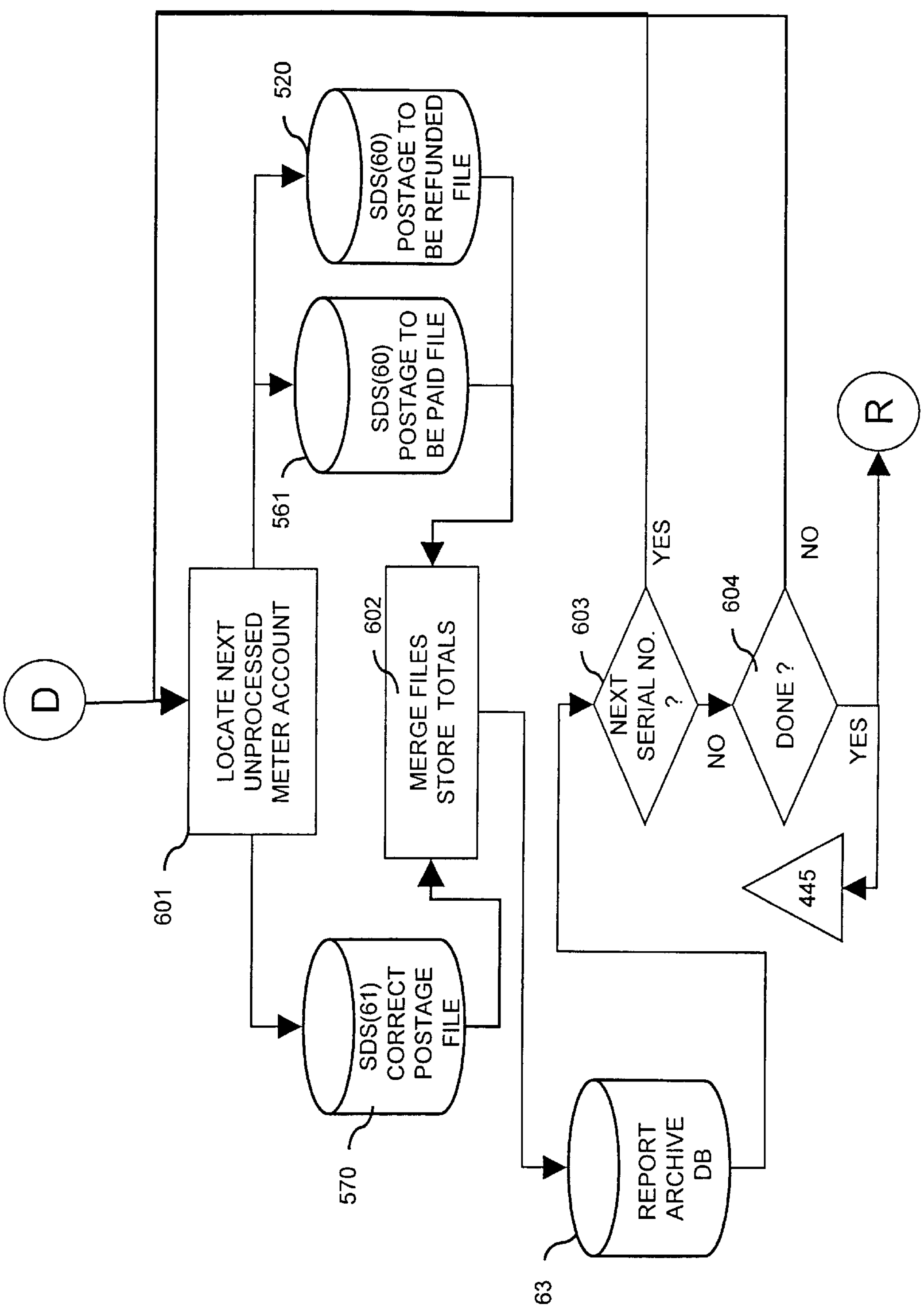

In block 551 the program locates the next unprocessed standardized data string record. Then the program goes to block 552 to compute the postage and compare the computed postage to the postage indicated as paid in the postal indicia. In performing the foregoing, block 552 receives information from rules rates data base 58, content owners data base 501 and standardized data string file data base 455. The program will go to decision block 553. Decision block 553 determines whether or not the computed postage matches the postage paid for in the postal indicia. If block 553 determines that the record indicates that the incorrect postage was paid, the standardized data string for that file is stored in block 570 and in data base 61. If block 553 determines that the record indicates that the correct postage was paid, the standardized data string for that file is stored in block 560 and in data base 60. Then the program goes to decision block 554. Decision block 554 determines whether or not there are any more standardized data strings in block 455. If there is another standardized data string from block 455 that has not been processed the program goes back to the input of block 551. If there is not another standardized data string from block 455 to be processed the program goes to the input of block 601 (FIG. 10).

Figure 11:
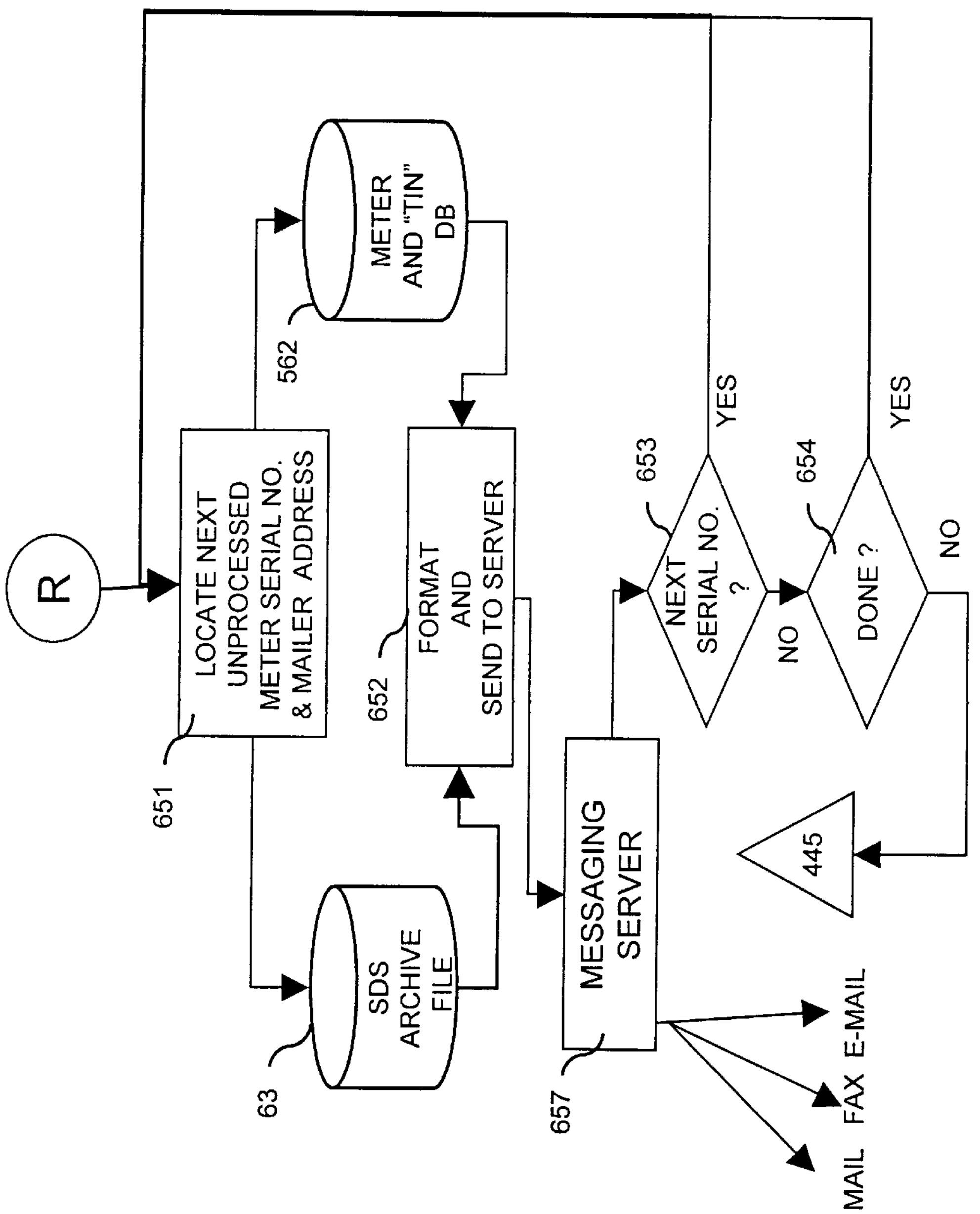

In block 601 the program locates the next unprocessed meter account. Then the program goes to: block 561 for additional postage to be paid, block 520 for postage to be refunded; and to block 570 for correct postage. The program will merge the above information and store the totals in block 602. Then the program will archive the files in report process and account data base 63. Now the program will go to decision block 603. Decision block 603 determines whether or not there is another serial number in the meter account to be processed. If block 603 determines that there is another serial number to be processed the program goes back to the input of block 601. If block 603 determines that there is not another serial number to be processed the program goes to the input of decision block 604. Decision block 604 determines whether or not there is another meter account to be processed. If there is another meter account to be processed the program goes back to the input of block 601 to find the next account. If block 604 determines that there is not another account to be processed the program goes back to the input of block 445 (FIG. 7) and to the input of block 651 (FIG. 11).

In block 651 the program locates the next unprocessed meter serial number and mailer mailing address for either the meter user or the owner of the mail piece. Then the program goes to blocks 562 and reports process and account archive data base 63 to respectively receive the meter and tax identification number and the meter usage. The program will format the above information and send the information to a server in block 652. Then in block 657 entitled messaging server the program will cause computer 57 (FIG. 3) to transmit the information as mail, facsimile, E-mail, etc.

Now the program will go to decision block 653. Decision block 653 determines whether or not there is another serial number to be processed. If block 653 determines that there is another serial number to be processed the program goes back to the input of block 651. If block 653 determines that there is not another serial number to be processed the program goes to the input of decision block 654. Decision block 654 determines whether or not there are any additional serial numbers in block 651 to be processed. If there are additional serial numbers in block 651 to be processed the program goes back to the input of block 651. If there are no serial numbers to be processed in block 651 the program goes back to the input of block 445 (FIG. 7) and to wait for the resumption of the process.

The above specification describes a new and improved system for correcting the rating and payment of mail pieces. It is realized that the above description may indicate to those skilled in the art additional ways in which the principles of this invention may be used without departing from the spirit. It is, therefore, intended that this invention be limited only by the scope of the appended claims.

What is claimed is:

1. A system for correcting the rating and payment of mail pieces, said system comprises:

a plurality of mailer's digital units that stores unique information that includes mail piece characteristics contained in a postal indicia affixed to each mail piece, wherein the unique information specifically identifies each mail piece and includes an amount of postage paid for each piece of mail;

a plurality of postal units that captures and stores the unique information contained in the postal indicia; and a data center that receives information stored by the mailer's units and the unique information captured by the postal units to determine if a proper amount of postage has been paid for servicing and handling of the mail.

2. The system claimed in claim 1, wherein the mailers unit includes the time and date that the postal indicia was affixed to the mail in the unique information contained in the postal indicia.

3. The system claimed in claim 1, wherein the mailers unit stores information that identifies the owner of the contents of the mail.

4. The system claimed in claim 1, wherein the unique information contained in the mailers units identifies the owner of the contents of the mail.

5. The system claimed in claim 1, wherein the postal units include a scanner that reads the postal indicia.

6. The system claimed in claim 5, wherein the scanner produces a record indicating that a specific indicia was produced.

7. The system claimed in claim 1, wherein the postal units include a scanner that weighs the mail.

8. The system claimed in claim 1, wherein the data center correlates the unique information stored in the mailers units with the unique information contained in the postal indicia read by the postal units.

9. The system claimed in claim 8, wherein the data center further includes: means for generating reports that indicate which mail have paid incorrect postage.

10. The system claimed in claim 8, wherein the data center further includes: means for generating reports that indicate which mail have paid correct postage.

11. The system claimed in claim 8, wherein the data center further includes: means for generating reports that indicate which mail have paid correct and incorrect postage.

12. The system claimed in claim 8, wherein the data center further includes: means for generating reports that indicate the mail and the mailers units that affixed indicia to the mail in which incorrect postage have been paid.

13. The system claimed in claim 12, wherein the data center further includes: means for informing the post of the mail and the mailers units that affixed indicia to the mail in which incorrect postage have been paid.

14. The system claimed in claim 3, wherein the data center further includes: means for generating reports that indicate the mail, the mailers units that affixed indicia to the mail and the owner of the contents of the mail in which incorrect postage have been paid.

15. The system claimed in claim 1, wherein the data center further includes: means for sorting the information received from each of the mailers units by the mailers unit that sent the information.

16. The system claimed in claim 1, wherein the mailers units are digital postage meters.

17. The system claimed in claim 1, wherein the mailers units are personal computer postage meters.

18. The system claim in claim 1, wherein the mailers units are virtual postage meters.

* * * * *